(12) United States Patent
Kusaba et al.

(10) Patent No.: US 6,708,575 B2
(45) Date of Patent: Mar. 23, 2004

(54) SENSOR ATTACHMENT STRUCTURE FOR RESTRICTING SENSOR REMOVAL

(75) Inventors: Takamitsu Kusaba, Nagoya (JP); Kazuo Kito, Nagoya (JP); Hiroshi Fujita, Obu (JP)

(73) Assignee: Denso Corporation, Kariya (JP)

( * ) Notice: Subject to any disclaimer, the term of this patent is extended or adjusted under 35 U.S.C. 154(b) by 104 days.

(21) Appl. No.: 10/010,368

(22) Filed: Dec. 6, 2001

(65) Prior Publication Data

US 2002/0073777 A1 Jun. 20, 2002

(30) Foreign Application Priority Data

Dec. 15, 2000 (JP) ......................... 2000-382520

(51) Int. Cl.[7] ............... G01D 11/00; G01K 1/14
(52) U.S. Cl. ............... 73/866.5; 374/152; 374/208; 29/739
(58) Field of Search ............... 73/866.5, 866.1, 73/865.9, 493, 494; 374/152, 141, 208; 29/739

(56) References Cited

U.S. PATENT DOCUMENTS 3,239,827 A * 3/1966 Werner et al. ............... 73/1.57
4,419,023 A * 12/1983 Hager, Jr. ............... 374/208 X

FOREIGN PATENT DOCUMENTS

| DE | 3843233 | * 6/1990 | ............... 237/5 |
| EP | 962718 | * 12/1999 | ............ F24F/11/02 |
| JP | 61-95239 | * 5/1986 | ............... 374/4 |
| JP | U4-94530 | 8/1992 | ............ G01K/1/14 |
| JP | 10-111051 | * 4/1998 | ............ F25B/49/02 |
| JP | 10141816 | * 5/1998 | ............ F25B/49/02 |

* cited by examiner

*Primary Examiner*—Thomas P. Noland
(74) *Attorney, Agent, or Firm*—Harness, Dickey & Pierce, PLC

(57) ABSTRACT

In a sensor attachment structure, a lead wire connecting a sensor is pinched in a pinch portion provided at a tip side portion of an extending bar, proximate to the sensor. The pinch portion has a protrusion that protrudes from the end surface of the pinch portion toward the sensor. A contact surface of the protrusion is inclined toward the sensor from a protruding direction of the pinch portion to have an inclination angle equal to or larger than a deflection angle that is formed at the tip side of the extending bar against the extending direction of the lead wire. Accordingly, even when a tensile force F is exerted to the lead wire opposite to the sensor side, a component force of the tensile force F along the contact surface becomes zero or is directed to the base of the pinch portion.

7 Claims, 3 Drawing Sheets

SENSOR ATTACHMENT STRUCTURE FOR RESTRICTING SENSOR REMOVAL

CROSS REFERENCE TO RELATED APPLICATION

This application relates to and incorporates herein by reference Japanese Patent Application No. 2000-382520 filed on Dec. 15, 2000.

BACKGROUND OF THE INVENTION

1. Field of the Invention

The present invention relates to a sensor attachment structure, which is suitable for attaching a temperature sensor for detecting cooling air temperature in an evaporator for an air conditioning device.

2. Description of Related Art

In a sensor attachment structure shown in FIG. 4A, a lead wire 12 connecting a sensor 11 is extended along an extending bar 21 and pinched in a pinch portion 22 at a position proximate to the sensor 11. As shown in FIG. 4B, the pinch portion 22 has two wall plates 24 defining a clearance 26a therebetween, and each of the wall plates 24 is provided with a protrusion 25 at the tip end thereof, so that a clearance 26b defined between the protrusions 25 is narrower than the clearance 26a.

As shown in FIG. 5, if a tensile force F is exerted to the lead wire 12 in an opposite direction to the sensor 11 when a sensor unit 10 attached to the bracket 20 is assembled to an air conditioning case 31 with a fixing portion 23, a tip side of the extending bar 21 of the bracket 20 is readily deflected. In this case, since a contact surface 22a that contacts the sensor 11 is inclined in a direction to the tensile force F, a component force F1 of the tensile force F is exerted along the contact surface 22a. When the component force F1 becomes larger than a frictional force f1 in response to strength of the tensile force F, the lead wire 12 is likely to be removed from the pinch portion 22. The clearance 26b at the tip side of the pinch portion 22 may be made narrow in order to prevent removal of the lead wire 12. However, in this case, the insertion of the lead wire 12 is worsened.

SUMMARY OF THE INVENTION

The present invention is made in view of the above problem and it is an object to provide a sensor attachment structure in which a lead wire is prevented from being removed due to tensile force, without worsening insertion of the lead wire into a pinch portion.

In a sensor attachment structure according to the present invention, a lead wire connecting a sensor is pinched in a pinch portion provided at a tip side of an extending bar, at a position proximate to the sensor. The lead wire is extended along the extending bar and the extending bar is fixed to a fixing portion at the other side end. The pinch portion is constructed of a pair of wall plates protruding approximately perpendicular to an extending direction of the extending bar. Further, the pinch portion has a protrusion that protrudes toward the sensor in an extending direction of the extending bar. Further, the protrusion is provided with a contact surface that is inclined toward the sensor from the protruding direction of the pair of wall plates. When tensile force is exerted to the lead wire in an opposite direction to the sensor, the extending bar is deflected. According to the above structure, a component force along the contact surface toward the protruding direction can be reduced, and it can restrict the lead wire from being removed.

Preferably, when an inclination angle of the contact surface is equal to a deflection angle of the extending bar against the extending direction of the lead wire, the inclined direction of the contact surface becomes perpendicular to the tensile force. That is, a component force along the contact surface becomes zero. Therefore, the lead wire is accurately prevented from being removed from the pinch portion.

In the present invention, since the protrusion is provided at the tip end of the pinch portion toward the sensor, it is unnecessary to narrow the clearance defined in the pinch portion in order to prevent the removal of the lead wire. Accordingly, insertion of the lead wire into the pinch portion is not worsened.

BRIEF DESCRIPTION OF THE DRAWINGS

Other objects, features and advantages of the present invention will become more apparent from the following detailed description made with reference to the accompanying drawings. In the drawings:

FIG. 2A shows a case where a contact surface of the pinch portion is inclined toward a sensor by the same angle as a deflection angle $\theta 1$ of an extending bar, and FIG. 2B shows a case where the contact surface is inclined toward the sensor by an angle $\theta$ larger than the deflection angle $\theta 1$ of the extending bar;

DETAILED DESCRIPTION OF PREFERRED EMBODIMENTS (First Embodiment)

A first embodiment of the present invention is described with reference to FIGS. 1A to 2B. The first embodiment is applied to an attachment structure of a sensor unit 100 that detects a cooling air temperature at a downstream side of an evaporator 320 within an air conditioning unit 300 of a vehicle air conditioning device.

Figure 1A:
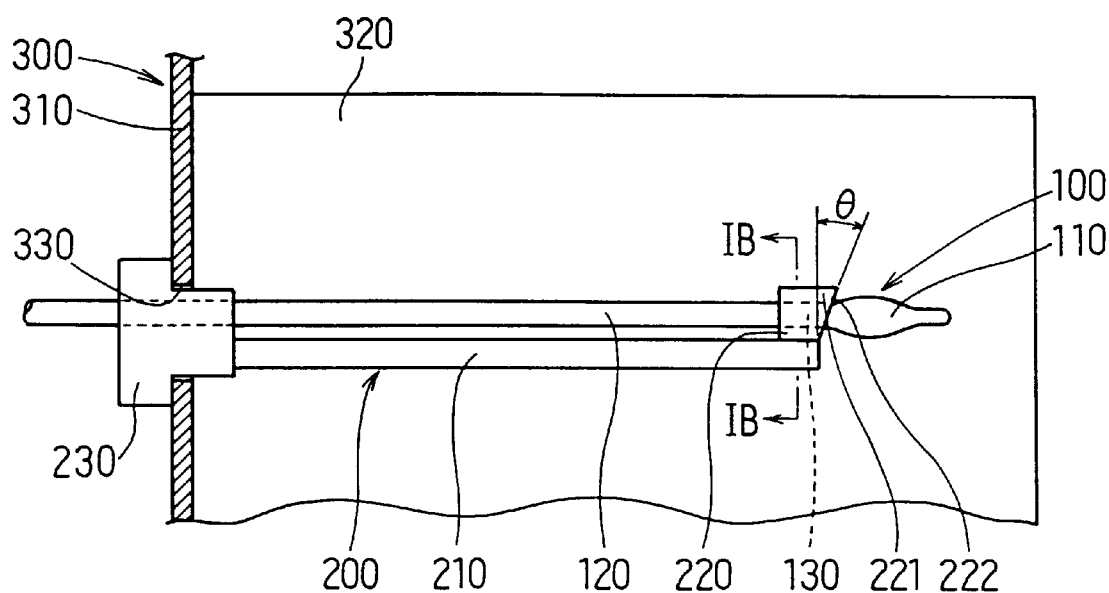
FIG. 1A schematically shows a sensor attachment structure according to a first embodiment of the present invention.

As shown in FIG. 1A, the evaporator 320 is disposed in an air conditioning case 310 of the air conditioning unit 300 to evaporate refrigerant in a refrigerant cycle and to cool air passing therethrough by latent heat of refrigerant vaporization. The sensor unit 100 is fixed by a bracket 200 at the downstream air side of the evaporator 320. Air flows from a paper back side to a paper front side in FIG. 1.

The sensor unit 100 includes a sensor 110 and a lead wire 120. The sensor 110 is connected to the lead wire 120 at a terminal 130. The sensor 110 has therein a therminal resister or a temperature sensitive semiconductor in which resistance changes in response to temperature. The lead wire 120 outputs the detected resistance as an electric signal to an electronic control unit controlling the air conditioning device.

The bracket 200 includes an extending bar 210 having a predetermined length, a pinch portion 220 that is provided at a tip side of the extending bar 210 to protrude in a direction crossing to an extending direction of the extending bar 210, and a fixing portion 230 to be fixed to the air conditioning case 310. The extending bar 210, the pinch portion 220 and the fixing portion 230 are made of resin, such as polypropylene, and integrated.

Figure 1B:
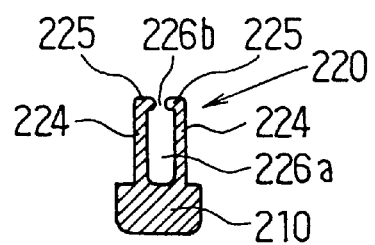
FIG. 1B is a cross-sectional view of a pinch portion taken along line IB—IB.

As shown in FIG. 1B, the pinch portion 220 is constructed by a pair of wall plates 224 protruding substantially perpendicular to the extending direction of the extending bar 210. The pair of wall plates 224 defines a clearance 226a therebetween. Each wall plate 224 is provided with an inner pinch protrusion 225, at a tip end, protruding inward to face to each other so as to define a clearance 226b narrower than the clearance 226a. Further, the pinch portion 220 includes a protrusion 221 that protrudes toward the sensor 110. In the first embodiment, the protrusion 221 is provided to more protrude toward the sensor 110, at the tip end of the pinch portion 220. In a state that the sensor 100 is attached to the bracket 200, a protrusion end surface (contact surface) 222 of the protrusion 221 contacting the sensor 110, is inclined toward the sensor 110 from the protruding direction of the wall plates 224. Here, an inclination angle θ of the contact surface 222 from the protruding direction of the wall plate 224 is set at about 30°, that is, about 60° against the extending direction of the extending bar 210.

The sensor unit 100 is assembled to the bracket 200 in a following manner. The lead wire 120 is inserted into the clearance 226a defined between the pair of wall plates 224 at a position proximate to the terminal 130. When the lead wire 120 is press-fitted through the clearance 226b defined between the pinch protrusions 225, the clearance 226b between the pinch protrusions 225 is enlarged by elastic deformation of the wall plates 224. The lead wire 120 is then pinched between the wall plates 224. Further, the lead wire 120 is extended along the extending bar 210 so that the lead wire is substantially in parallel to the extending direction of the extending bar 210. Then, the fixing portion 230 of the bracket 200 is inserted into a hole 330 of the air conditioning case 310 to be fixed.

According to the above structure, a temperature of cooling air is detected by the sensor 110 and is inputted to the electronic control unit as a temperature signal, that is, a resistance based on temperature, through the lead wire 120, so that a compressor constructing a refrigerant cycle is turned on/off and an opening degree of an air mixing door is controlled.

Especially, if condensed water adheres on a surface of the evaporator 320, when the evaporator 320 is cooled under 0° C., a heat exchange effectiveness of the evaporator 320 is lessened because the condensed water on the surface of the evaporator 320 is frozen or frosted. However, the on/off operation of the compressor is controlled based on the temperature detected at the sensor unit 100, thereby restricting the freezing.

Figure 2A:
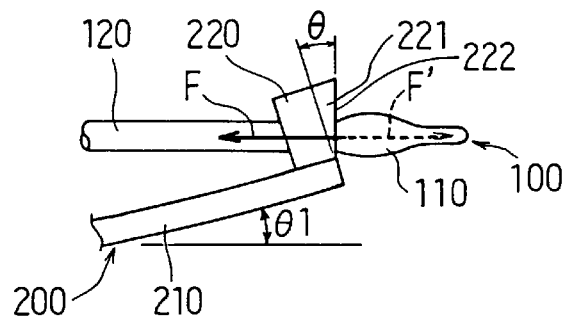
FIGS. 2A and 2B are schematic diagrams of the pinch portion when tensile force F is exerted to a lead wire, particularly.

Incidentally, when or after the sensor unit 100 pinched in the pinch portion 220 of the bracket 200 is fixed to the air conditioning case 310, a tensile force F exerting in an opposite direction to the sensor 110 may occur to the lead wire 120 dependent on its treatment. As shown in FIG. 2A, when the tensile force F is exerted to the lead wire 120, the tip side of the extending bar 210 of the bracket 200 is deflected by elastic deformation at the fixing portion 230 as a fulcrum. In this case, the tip side of the extending bar 210 is deflected at θ1 from the extending direction of the lead wire 120. When the contact surface 222 of the protrusion 221 is inclined toward the sensor 110 by the same angle θ as the deflection angle θ1 of the extending bar 210, an inclined direction of the contact surface 222 becomes approximately perpendicular to the tensile force F. Therefore, the tensile force F balances with a resistance force F'. That is, a component force along the contact surface 222 becomes zero. As a result, the lead wire 120 is prevented from being removed from the pinch portion 220.

Figure 2B:
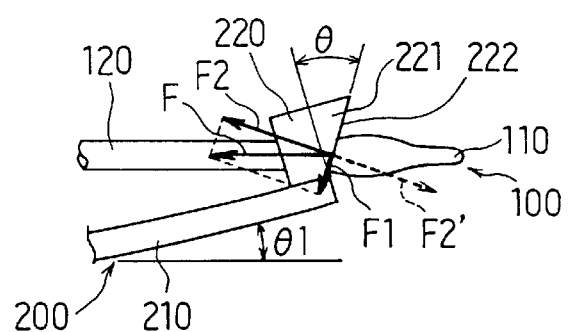

Further, as shown in FIG. 2B, when the inclination angle θ of the contact surface 222 is set about 30° to be larger than the deflection angle θ1 (about 5 to 10°) of the extending bar 210 (θ>θ1), the component force F1 of the tensile force F along the contact surface 222 can be directed toward a base of the pinch portion 220. Thus, the lead wire 120 is effectively restricted from being removed from the pinch portion 220.

In this case, it is unnecessary to narrow the clearance 226b of the pinch portion 220 in order to restrict the removal of the lead wire 120 from the pinch portion 220. Therefore, an inserting condition of the lead wire 120 into the pinch portion 220 is not worsened.

(Second Embodiment)

A second embodiment of the present invention is described with reference to FIG. 3. In the second embodiment, a shape of the protrusion 221 including the contact surface 222 is changed from that of the first embodiment.

Figure 3:
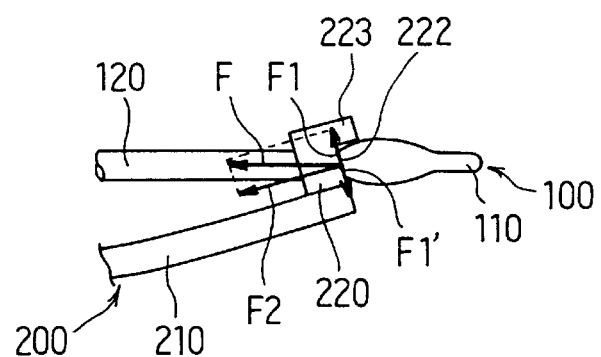
FIG. 3 shows the component force exerted to the pinch portion according to a second embodiment of the present invention.
Figure 4A:
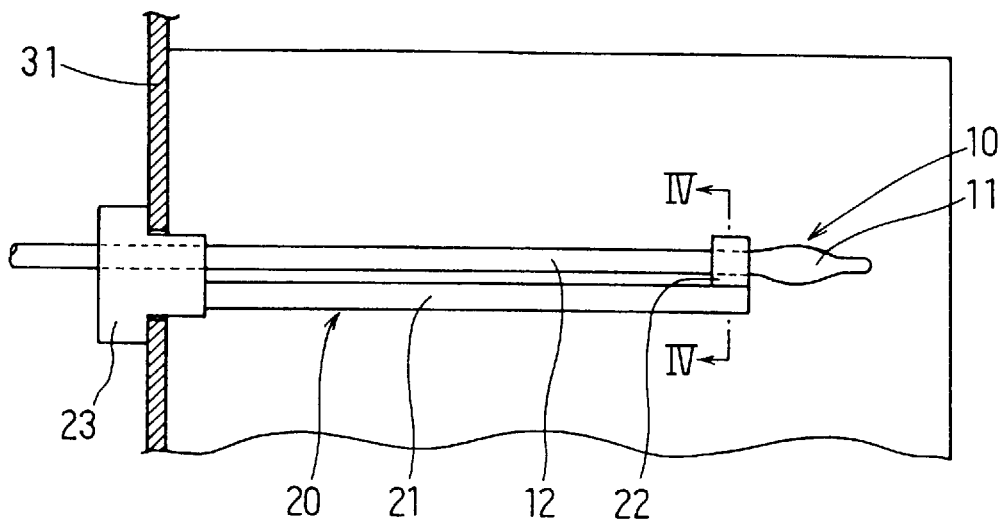
FIG. 4A shows a schematic view of a sensor attachment structure and FIG. 4B is a cross-sectional view of a pinch portion taken along a line IV—IV.
Figure 4B:
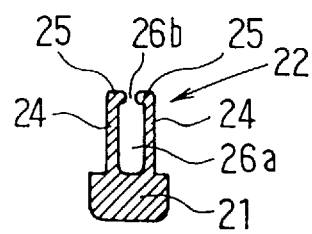
Figure 5:
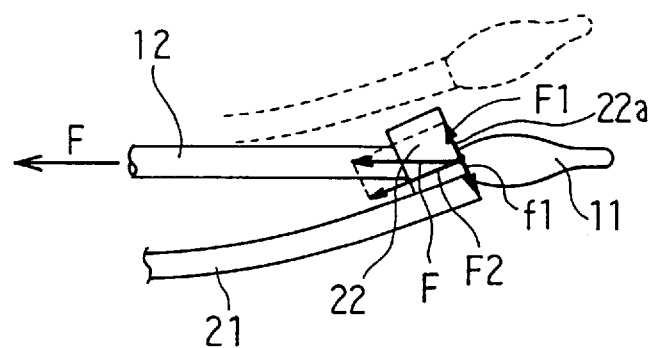
FIG. 5 shows a component force exerted to a pinch portion when tensile force is exerted to a lead wire in the sensor attachment structure.

In the second embodiment, as shown in FIG. 3, a partial protrusion 223 is provided so as to protrude from a part of the contact surface 222 toward the sensor 110 in the extending direction of the extending bar 210. That is, the partial protrusion 223 protrudes substantially perpendicular to the contact surface 222 at the tip side of the pinch portion 220. In this structure, if the tensile force F is exerted to the lead wire 120 and the tip side of the extending bar 210 is deflected, the sensor 110 is forced to the partial protrusion 223. Also, the component force F1 exerted along the contact surface 222 at the tip end surface of the pinch portion 220 is reacted as the resistance force F1' by the protrusion 223, thereby further restricting the lead wire 120 from being removed form the pinch portion 220.

(Other modifications)

The shape of the protrusion 221, 223 provided at the tip end of the pinch portion 220 is not limited to the above. For example, the contact surface 222 may be partially inclined toward the sensor 110 like a protrusion, so that the sensor 110 may be forced to the contact surface 222. Even in this case, the lead wire 120 can be prevented from being removed from the pinch portion 220.

Further, in the above first and second embodiments, the sensor attachment structure is used for the sensor unit 100 that detects the air temperature at the downstream side of the evaporator 320 within the vehicle air conditioning device. However, this structure of the present invention is not limited to the sensor unit 100. It may be applied to the other temperature sensors or pressure sensors in which the lead wire 120 is pinched at the pinch portion 220 provided at the tip side of the extending bar 210 and fixed at the fixing position.

The present invention should not be limited to the disclosed embodiments, but may be implemented in other ways without departing from the spirit of the invention.

What is claimed is:

1. A sensor attachment structure comprising:

a sensor;

a lead wire connected to the sensor;

an extending bar extending along the lead wire in an extending direction; and a pinch portion provided at a tip side of the extending bar in the extending direction, the pinch portion including a pair of wall plates protruding in a protruding direction approximately perpendicular to the extending direction of the extending bar for pinching the lead wire at a position proximate to the sensor; and a protrusion that protrudes from an end surface of the pinch portion toward the sensor in the extending direction.

2. The sensor attachment structure according to claim 1, wherein the protrusion has a contact surface inclined toward the sensor from the protruding direction of the pair of wall plates to contact the sensor.

3. The sensor attachment structure according to claim 2, wherein the contact surface of the protrusion is inclined from the protruding direction toward the sensor by an angle larger than a deflection angle of the extending bar, said deflection angle formed at the tip side of the extending bar against the lead wire when tensile strength is exerted to the lead wire in a direction opposite to the sensor.

4. The sensor attachment structure according to claim 2, wherein the contact surface of the protrusion is inclined toward the sensor so that an inclining direction of the contact surface is substantially perpendicular to the lead wire when the tip side of the extending bar is deflected by tensile force exerted to the lead wire opposite to the sensor.

5. The sensor attachment structure according to claim 1, wherein the protrusion is provided to protrude from an end surface of the pinch portion toward the sensor substantially perpendicular to the protruding direction of the pair of wall plates.

6. The sensor attachment structure according to claim 5, wherein the protrusion contacts the sensor when a tip side of the extending bar is deflected due to tensile force exerted to the lead wire in the direction opposite to the sensor.

7. The sensor attachment structure according to claim 1, further comprising:

a fixing portion provided on the extending bar at an opposite side of the pinch portion.

\* \* \* \* \*